(12) United States Patent
Telljohann et al.

(10) Patent No.: US 7,865,429 B2
(45) Date of Patent: Jan. 4, 2011

(54) BUNDLED MORTGAGE PACKAGE

(75) Inventors: Eric Telljohann, Charlotte, NC (US); Gina M. Turpin, Elverta, CA (US); Julie Pietras, Charlotte, NC (US); Kevin Montgomery, Matthews, NC (US); Laura Kneavel, Cary, NC (US); Pat Mooney, San Francisco, CA (US); Aditya Bhasin, Charlotte, NC (US); Neelu Burugapalli, Stanley, NC (US); Richard Bramhall, Charlotte, NC (US); Danny J. Adkins, Davidson, NC (US); Loren Bennett, Dallas, TX (US); Rachel Nemecek, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 19 days.

(21) Appl. No.: 11/955,514

(22) Filed: Dec. 13, 2007

(65) Prior Publication Data

US 2008/0262921 A1 Oct. 23, 2008

Related U.S. Application Data

(60) Provisional application No. 60/913,480, filed on Apr. 23, 2007.

(51) Int. Cl.
*G06Q 40/00* (2006.01)
(52) U.S. Cl. ...................................... 705/38
(58) Field of Classification Search .............. 705/35–42
See application file for complete search history.

(56) References Cited

U.S. PATENT DOCUMENTS

| | | | |
|---|---|---|---|
| 6,988,082 B1* | 1/2006 | Williams et al. ........... 705/36 T |
| 2002/0059136 A1 | 5/2002 | May | |
| 2002/0082984 A1* | 6/2002 | Zappier ....................... 705/38 |
| 2004/0002915 A1* | 1/2004 | McDonald et al. ............ 705/38 |
| 2004/0019558 A1* | 1/2004 | McDonald et al. ............ 705/38 |
| 2004/0167850 A1* | 8/2004 | Dreyer et al. ................. 705/38 |
| 2004/0215552 A1* | 10/2004 | Horn et al. .................... 705/38 |

(Continued)

OTHER PUBLICATIONS

"Seeking competitive edge, some small banks waive PMI", Anonymous, Community Banker, Washington: May 2003. vol. 12, iss 5; p. 16.*

(Continued)

*Primary Examiner*—Ella Colbert
*Assistant Examiner*—Mohammad Z Shaikh
(74) *Attorney, Agent, or Firm*—Banner & Witcoff, Ltd

(57) ABSTRACT

A bundled mortgage package which includes several different features into a mortgage package, so that the process of actually obtaining a mortgage from a lender can be easier because the borrower's worries of the fees, charges, and other costs can be reduced or altogether eliminated since such fees charges and other costs may be combined, waived or otherwise resolved for the borrower is described. The lender may waive all lender fees, pay all 3$^{rd}$ party fees, and not require a lender's title policy. The lender may use the owner's title policy as the sole title insurance. A lender may not require mortgage insurance, waive fees associated with programs for borrower protection for involuntary unemployment or accidental death, guarantee that the loan will close within a certain period of time where the lender pays the borrower money if the loan doesn't close within the certain time period.

16 Claims, 4 Drawing Sheets

U.S. PATENT DOCUMENTS

| | | | |
|---|---|---|---|
| 2005/0108064 A1* | 5/2005 | Castleman et al. | 705/4 |
| 2005/0131787 A1 | 6/2005 | Monteleone et al. | |
| 2005/0182702 A1 | 8/2005 | Williams, III | |
| 2006/0089895 A1 | 4/2006 | Joye et al. | |
| 2006/0143113 A1* | 6/2006 | Bercovitz | 705/38 |
| 2008/0005016 A1* | 1/2008 | Uhlmann et al. | 705/38 |
| 2008/0120226 A1* | 5/2008 | Wegmann et al. | 705/38 |

OTHER PUBLICATIONS

"Tell us What you think About.. RESPA reform, Guaranteed Mortgage Packages and Fee Bundling", Jan. 2007, HSH Associates Financial Publishers.*

"Title Industry Experiences Boost from Low Mortgage Rates", Christian Murray. Knight Ridder Tribune Business News. Washington: Jul. 25, 2003, p. 1, herein Murray and further in view of "Pros and Cons of Making Title Insurance optional", Holden Lewis, Scripps Howard News Service, Pittsburg Post-Gazette. Mar. 3, 2002, p. F.4.*

Title Insurance protects Lenders So Why shouldn't they pay for it?, Wall Street Journal, Feb. 10, 2005, Terri Cullen.*

Kenneth Harney. (Feb. 12, 2005). Realtors compete for your home loans, titles, insurance :[Final Edition]. The Post and Courier, p. G2. Retrieved Aug. 19, 2010, from ProQuest Newsstand.*

Craig Linder. (Dec. 22, 2003). Sudden Respa Rush Drawing Opposition. American Banker, p. 1. Retrieved Aug. 19, 2010, from Accounting & Tax Periodicals.*

Christian Murray. Staff Writer. (Dec. 11, 2003). HUD Reform in Doubt / Secretary's departure puts home-buing changes in limbo :[All Editions]. Newsday (Combined Editions), p. A52. Retrieved Aug. 19, 2010, from Newsday.*

Bailey, Doug, "Pilot Plan to ease Hub home buying", Boston Globe. Oct. 17, 1993, p. 1.*

Brutlag, Michelle, "Fair Offers Help on Buying a Home", Courier & Press. Evansville, Ind: Jun. 8, 2003. p. B.3.*

"Seeking competitive edge, some small banks waive PMI", Community Banker, May 2003: v12 No. 5, pp. 16.*

International Preliminary Report on Patentability and Written Opinion corresponding to PCT/US2008/061151 dated Nov. 5, 2009.

International Search Report and the Written Opinion of the International Searching Authority, dated Nov. 3, 2008 relating to PCT/US08/61151.

* cited by examiner

- Competitive Rates - 201
- No Lender Fees - 203
- 3rd Party Fees Waived - 205
- Alternative Title - 207
- No Required Escrow Account - 209
- Lack of Escrow Account Fee Waived - 211
- No Mortgage Insurance - 213
- Protection Plan Fee Waived - 215
- Time Guarantee - 217
- Value Guarantee - 219
- Other Features - 221

Mortgage Package
200

Figure 2

BUNDLED MORTGAGE PACKAGE

BACKGROUND

Obtaining a mortgage can be a difficult task. Traditionally, when a borrower obtains a mortgage from a lender, the borrower incurs a myriad of fees, charges and other costs associated with the mortgage process. The amount of the fees and charges could add substantially to the amount the borrower was considering borrowing for the property. In fact, a borrower may have to borrow more than originally anticipated for the property just to pay for the many additional fees associated with title insurance, mortgage insurance, and closing costs. Obtaining such items as mortgage insurance, title insurance, etc. are additional costs the borrower has to consider, in addition to other fees and charges.

Further, choosing a lender from which to borrow the money for the property could be just as daunting for the borrower as obtaining the mortgage itself. In today's market there are many lenders from which a borrower may obtain a mortgage. Attempting to determine which lender to use can be difficult and depends on a host of factors including convenience, trust, interest rates, total cost, etc. Further, lenders may offer incentives in order to attract customers to obtain a mortgage with them as opposed to other lenders. These incentives can add to the difficulty the borrower faces in determining which lender to choose because different lenders offer different incentives. Therefore, the incentives offered add another variable to the considerations the borrower must take into account when comparing the lenders.

SUMMARY

In light of the arduous process of obtaining a mortgage, the need exists for a bundled mortgage package which combines several different value propositions, or features, in a single bundled mortgage package. By bundling several different features into a mortgage package, the process of choosing a lender can be easier, because a borrower will not have to compare lenders who offer some features but not other features with lenders who offer even other different features.

Further, by bundling several different features into a mortgage package, the process of actually obtaining a mortgage from a lender can be easier because the borrower's worries of the fees, charges, and other costs can be reduced or altogether eliminated since such fees, charges and other costs may be combined, waived or otherwise resolved for the borrower. Such features of the bundled mortgage package may include the lender waiving all lender fees, paying all $3^{rd}$ party fees, and not requiring a lender's title policy. Instead, a lender may use the owner's title policy as the sole title insurance. A lender may not require an escrow (or impound) account and/or may waive any fee associated with a lack of an escrow (or impound) account. A lender may not require mortgage insurance, waive fees associated with programs for borrower protection for involuntary unemployment or accidental death, guarantee that the loan will close within a certain period of time where the lender pays the borrower money if the loan doesn't close within the certain time period, and guarantee that the mortgage package is the best value where the lender pays the customer money if the customer is approved but finds a "better deal" from another lender.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

FIG. 2 is a schematic view of an illustrative example of a bundled mortgage in accordance with at least one aspect of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made.

Figure 1:
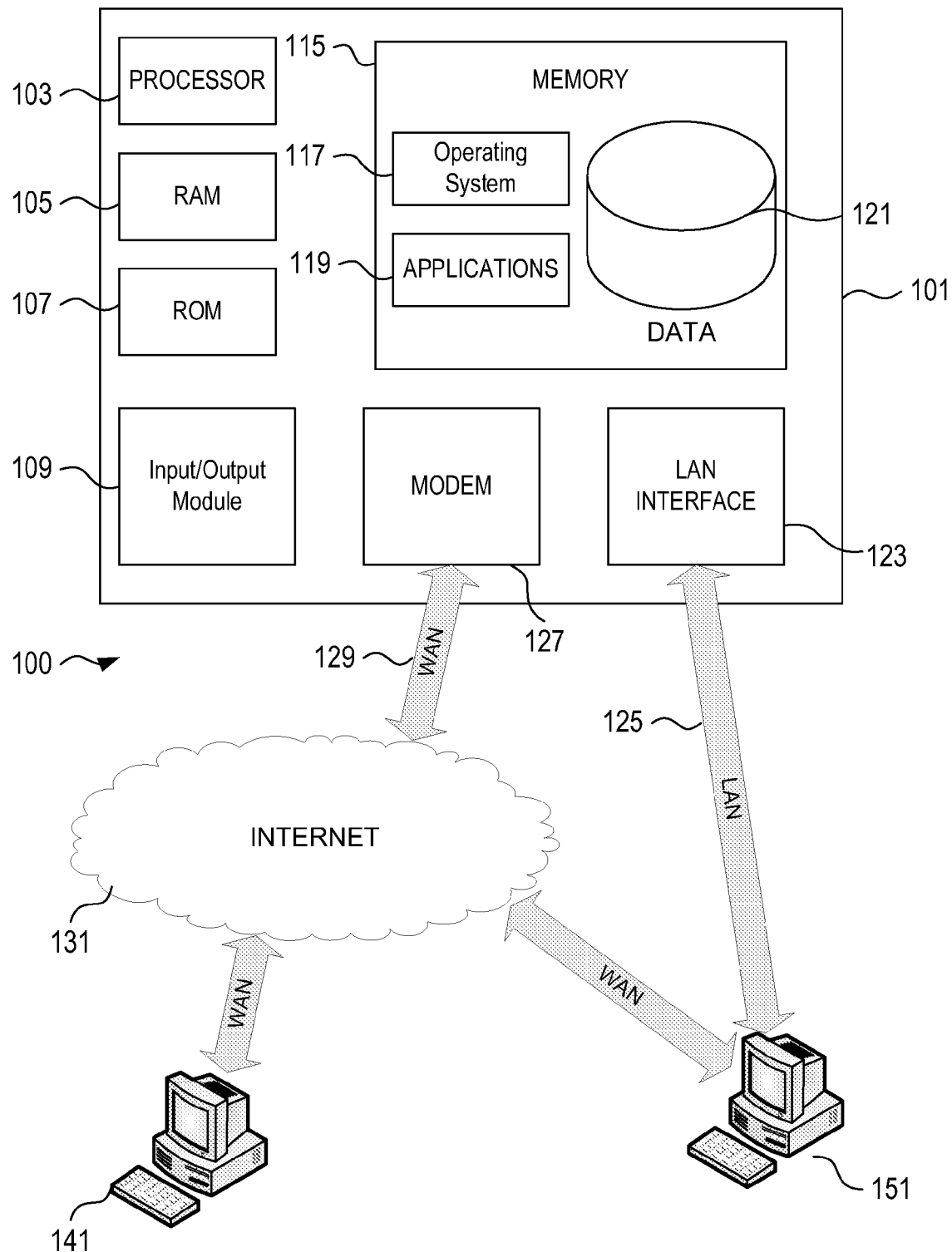
FIG. 1 illustrates a schematic diagram of a general-purpose digital computing environment in which certain aspects of the present invention may be implemented.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computer 101 having a processor 103 for controlling overall operation of the computer 101 and its associated components, including RAM 105, ROM 107, input/output module 109, and memory 115. Computer 101 typically includes a variety of computer readable media.

Computer readable media may be any available media that may be accessed by computer 101 and include both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 101. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. Although not shown, RAM 105 may include one or more are applications representing the application data stored in RAM memory 105 while the computer is on and corresponding software applications (e.g., software tasks), are running on the computer 101.

Input/output module 109 may include a microphone, keypad, touch screen, and/or stylus through which a user of computer 101 may provide input, and may also include one or more of a speaker for providing audio output and a video display device for providing textual, audiovisual and/or graphical output. Software may be stored within memory 115 and/or storage to provide instructions to processor 103 for enabling computer 101 to perform various functions. For example, memory 115 may store software used by the computer 101, such as an operating system 117, application programs 119, and an associated database 121. Alternatively, some or all of computer 101's computer executable instructions may be embodied in hardware or firmware (not shown). As described in detail below, the database 121 may provide centralized storage of account information and account holder information for the entire business, allowing interoperability between different elements of the business residing at different physical locations.

Computer 101 may operate in a networked environment supporting connections to one or more remote computers, such as branch terminals 141 and 151. The branch computers 141 and 151 may be personal computers or servers that include many or all of the elements described above relative to the computer 101. The network connections depicted in FIG. 1 include a local area network (LAN) 125 and a wide area network (WAN) 129, but may also include other networks. When used in a LAN networking environment, computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Terminals 141 or 151 may also be mobile terminals including various other components, such as a battery, speaker, and antennas (not shown). Input/output module 109 may include a user interface including such physical components as a voice interface, one or more arrow keys, joystick, data glove, mouse, roller ball, touch screen, or the like.

FIG. 2 illustrates aspects of the present system and method that relate to a bundled mortgage package 200. In accordance with one or more aspects of the present invention, several features of a mortgage program may be bundled together into a single bundled mortgage package. Each of the features may be attractive to a potential customer for different reasons. However, the bundling of some or all of the features into a single mortgage package may be even more attractive to a potential customer both in terms of choosing a lender and actually obtaining the mortgage once the lender has been chosen.

The interest rates used to calculate a mortgage payment is one factor a buyer/borrower may consider on whether to choose a particular lender. Often, a borrower will want to pay at the lowest interest rate available when possible. Lenders may set the interest rate of a particular mortgage depending on a variety of factors. Traditionally, some features such as mortgage insurance affect an interest rate a lender decides to use. Given the effect the interest rate may have on whether a borrower chooses a particular lender, lenders offer interest rates competitive with other lenders in hopes of attracting potential borrowers. In accordance with aspects of the present invention, feature 201 corresponds to a lender offering interest rates that are competitive with other lenders. The competitive interest rates combined with bundled features such as described herein allow a lender to have a greater chance of attracting a potential borrower as opposed to a lender with a similar interest rate but no bundled package.

Lender fees such as application fees, origination fees, mortgage arrangement fees, administration fees, etc. are fees charged by the lender in connection with obtaining a mortgage. Feature 203 corresponds to a component where a lender would not charge lender fees. In other words, a lender waives all lender fees related to the mortgage in the bundled package 200. By eliminating the lender fees via feature 203, a borrower has a monetary savings which will aid in creating good will. For example, a lender who waives the application fee thereby encourages a potential borrower to at least apply for the mortgage because there is no monetary loss to the potential borrower.

Third party fees are fees paid to third parties (i.e. not the lender or the borrower) in connection with obtaining a mortgage. For example, third party fees may include settlement fees, attorney fees, owner's title fees, recording fees, etc. Feature 205 corresponds to a lender paying for any third party fees. In accordance with one aspect, an alternative feature 205 may correspond to a lender paying all customary third party fees. A non-customary third party fee might be, for example, a termite inspection, taxes, or a homeowner's inspection. When the lender pays for all the third party fees or all customary third party fees, the borrower has a monetary savings which will aid in creating good will. For example, lender paid closing costs may eliminate the borrower's worry about having to save up to be able to pay the closing costs. Traditional systems, at best, offer discounts for closing costs. But these discounts are always fixed in nature. They amount to a discount of $500 or some specified amount. They are not fixed to an actual incurred cost. For example, under the present invention, title fees, recording fees, and survey fees may be paid for by the lender. If the fees are $842.13, those fees are paid. If the fees are different for another property, such as the survey fee being more for a larger piece of property, that different fee is paid in accordance with feature 205.

Title insurance is insurance to protect against loss that would occur from a defect in title to real property. Title insurance may be obtained by either a borrower or a lender. Title insurance protects the financial interest in the property by typically insuring the holder of the title for the actual monetary loss incurred as a result of a defect in the title. Since both a lender and a borrower each have her/their own separate financial interest in a property, typically the lender and the borrower each have their/her own title insurance. Such policies may be referred to as a lender's title policy and an owner's title policy respectively. Feature 207 corresponds to a lender forgoing their own lender title policy. In this way, a lender relies on the owner's title policy to ensure there are no defects in title to the property. Therefore, the cost of a separate lender's title policy is avoided.

An escrow account is an arrangement wherein finances are placed with a third party to be held in trust pending fulfillment of a condition. In obtaining a mortgage, an escrow (or impound) account traditionally is required of the borrower by the lender to hold money for future taxes, insurance, etc. Typically, if a borrower does not set up an escrow account the lender will charge a waiver fee. Feature 209 corresponds to a lender not requiring a borrower to have or set up an escrow account. In addition, feature 211 may be included. Feature 211 corresponds to a lender waiving any fee typically associated with a borrower not setting up an escrow account. In other words, in accordance with one or more aspects of the present invention, the lender will not require an escrow account and will not charge a fee for the borrower not having or setting up and escrow account.

Mortgage insurance is an insurance policy that guarantees repayment of a mortgage loan if a borrower cannot repay the loan. Typically, in a mortgage situation, if a borrower requires a loan for more than 80 percent of the value of the property, a lender requires the borrower to obtain private mortgage insurance (PMI). PMI is protection for the lender in the event of default by the borrower.

There is a secondary market for mortgage loans once they are obtained where a lender can sell the mortgage to potential investors. For a mortgage loan to be sold on a secondary market, mortgage insurance is required. Therefore, mortgage insurance is very prevalent in the market. Feature 213 corresponds to a lender waiving the requirement of mortgage insurance regardless of the amount borrowed by a borrower. In other words, a lender will not require a borrower to obtain mortgage insurance nor will the lender obtain its own mortgage insurance. There is simply no mortgage insurance on the offered mortgage at all.

Such a feature may be very attractive for a borrower who wishes to avoid purchasing PMI. Further, such a feature may be very attractive for a borrower who does not want to take out a separate loan, such as a second mortgage, for any amount over the 80 percent threshold to avoid the PMI. As second mortgages usually carry a much higher interest rate, a borrower need not worry about differing interest rates for the different amounts borrowed and need not worry about the differing restrictions and requirements on the differing first and second mortgages. For example, traditionally instead of borrowing one hundred percent of the value of the property from one lender, a borrower often borrows 80 percent in one loan (and thereby avoid PMI) and borrow the rest of the 20 percent in one or multiple other loans. This feature of not requiring mortgage insurance, regardless of the amount borrowed, prevents the borrower's hassle of obtaining several loans or from obtaining PMI.

Lenders may offer arrangements with a borrower that provide different types of protection for the borrower if the borrower suffers from such occurrences as involuntary unemployment or accidental death. The protection provided may differ depending on the type of plan joined. Further, lenders may charge fees to join such programs. Feature 215 corresponds to a lender waiving any fee associated with joining such a protection plan.

Another feature of this system and/or method is an agreement between a borrower and a lender where the lender guarantees the loan will close within a certain time period. If the loan does not close within that certain time period, the lender will pay the borrower/customer a specified amount of money. Under feature 217, the amount of money may be the equivalent of the borrower's first mortgage payment. Purely by way of example, a lender may guarantee that the loan will close within 25 days. In accordance with feature 217, if the lender does not keep the promise and the customer notifies the lender of this within a certain time period, the lender will pay the borrower the equivalent of the borrower's first mortgage payment.

In accordance with one or more aspects of the present invention, another feature of this system and/or method may be an agreement between a borrower and a lender that the lender guarantees the mortgage package is the best value compared with other lenders' offers. Under feature 219, if a lender does not provide the best value to a borrower, the lender will pay the borrower a specified amount of money.

Other features 221 correspond to other features of the bundled mortgage package 200 that may be included. In an illustrative example, a lender may pay for the borrower's title insurance. This may be a tremendous benefit to the borrower, because she does not have to pay for any title insurance and yet still has the protection of an owner's title policy because the lender has paid for the owner's title insurance. Under such a feature, the lender avoids the cost of the lender's title policy.

The combination of some or all of the above described features into a single bundled mortgage package provides more assistance to a borrower in the process of choosing a lender. Further, the combination of some or all of the above described features into a single bundled mortgage package provides more assistance to a borrower in the process of actually obtaining a mortgage once a lender has been chosen.

For example, in accordance with one or more aspects described herein, a borrower who chooses a bundled package mortgage would not have to obtain mortgage insurance. Further, the borrower would not have to pay any lender or customary third party fees. The borrower would have an owner's title insurance policy yet not have to pay for the title insurance. Still further, the borrower would not have to set up an escrow account or pay a fee for not setting up an escrow account, and a borrower would not have to pay a fee to receive protection against involuntary unemployment or accidental death. Finally, the borrower would receive best value and on-time closing guarantees. In this example, the borrower would save a substantial amount of money compared to a mortgage which had none or perhaps only some of the above features. Therefore, both the substantial savings and lack of hassle would alleviate the borrower's concerns about obtaining a mortgage.

As stated above, a factor a borrower may consider in deciding which lender to choose may include convenience. A further aspect of this system and/or method is for a borrower to be able to obtain a mortgage through a variety of different avenues. For example, a potential borrower may contact a loan officer directly. Alternatively a potential borrower may use telephone channels or go through a branch of a financial institution where the potential borrower already has a preexisting relationship such as a checking or savings account. By providing several different avenues, added convenience is provided to the borrower.

Figure 3:
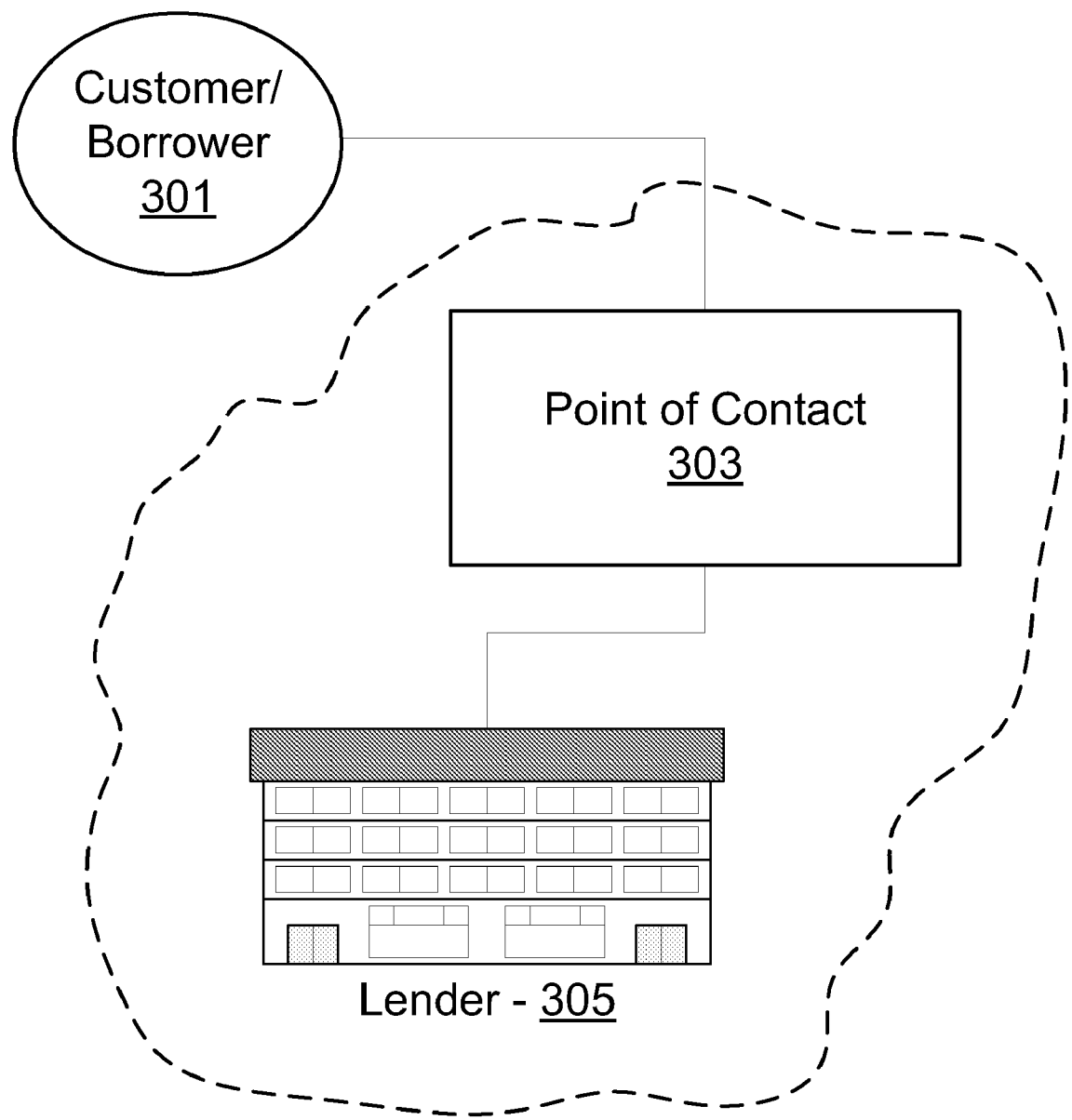
FIG. 3 is a block diagram of an operational environment in which one or more aspects of the present invention may be utilized.

FIG. 3 is a block diagram of an operational environment in which one or more aspects of the present invention may be utilized. In accordance with one or more aspects of the present invention, a customer/borrower 301 may initiate contact with a lender 305 via a point of contact 303. Point of contact 303 may represent an associate that is an actual employee of the lender 305. As such, the broken line around the point of contact 303 and lender 305 represents that they may be part of a single entity. In an alternative example, the point of contact 303 may be an individual or entity that is separate from the lender 305 with no particular affiliation. For example, point of contact 303 may be a loan officer or a realtor. In addition, although not shown in the figures, one or more points of contact 303 between a customer/borrower 301 and a lender 305 may exist beyond the single reference described herein.

Upon initiating contact with a point of contact 303, a bundled mortgage package, such as bundled mortgage package 200, may be offered to the customer/borrower 301 in accordance with one or more aspects of the present invention. For pre-existing customers of lender 305, such as a customer 301 with an existing checking and savings account, the ability to have a predefined bundled mortgage in accordance with the aspects of the present invention allow a lender 305 to maintain a positive relationship with customer 301.

Figure 4:
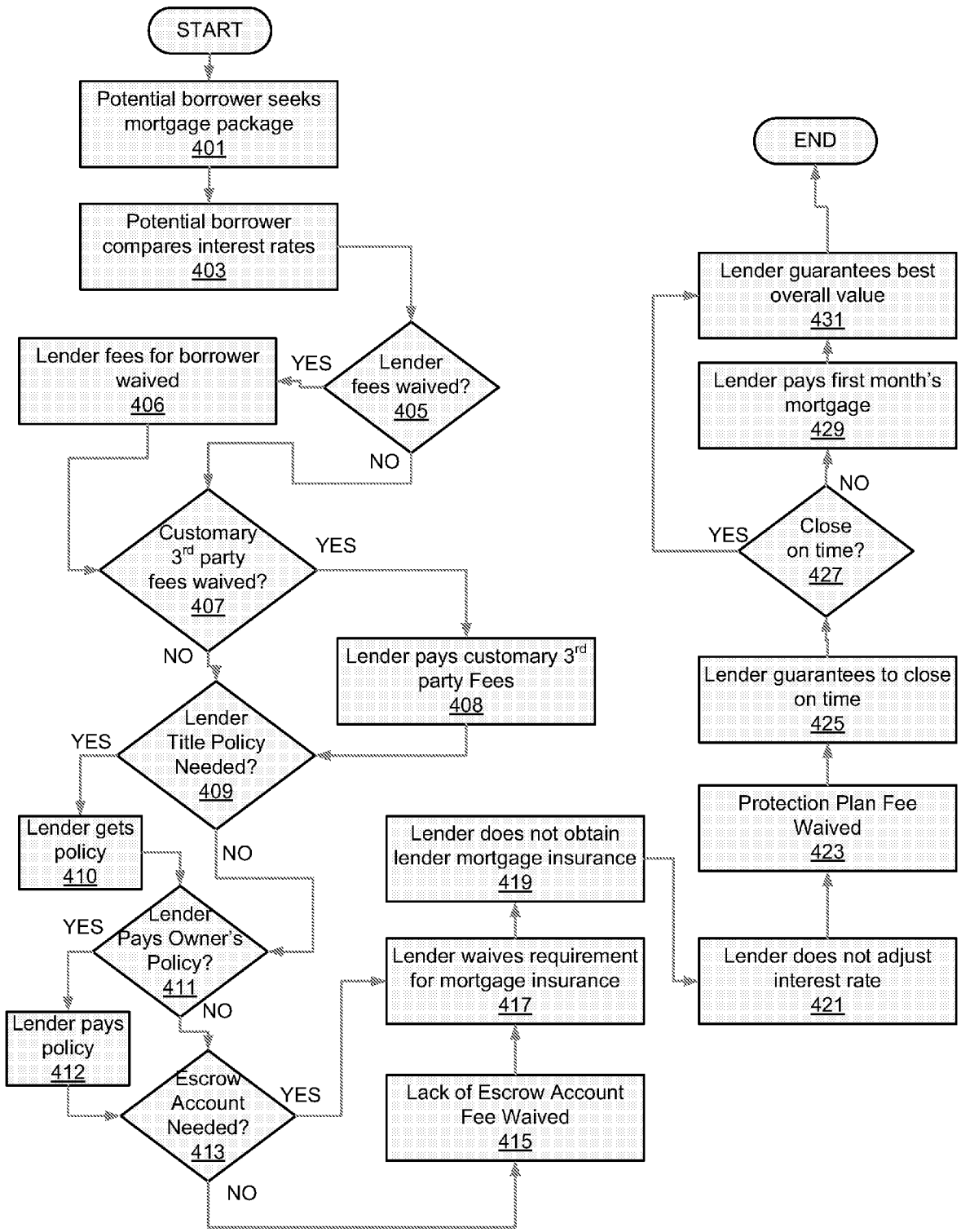
FIG. 4 is a flowchart of an illustrative example of a method for securing a mortgage in accordance with at least one aspect of the present invention.

FIG. 4 is a flowchart of an illustrative example of a method for securing a mortgage in accordance with at least one aspect of the present invention. The process starts at step 401 where a potential borrower seeks a mortgage package. Such may be the case when a borrower decides to look into buying a home, or has already decided and now needs financing. At step 403, the potential borrower may compare various interest rates of different lenders. Lenders may be competitive and offer near exact interest rates. At step 405, a determination is made as to whether a particular lender has a mortgage package to secure a loan from the borrower by allowing for a waiver of applicable lender fees. If there is no waiver, the process moves to step 407. If there is a waiver of the lender fee, the process moves to step 406.

At step 406, the lender fees for the potential borrower are waived. Such may be included generally for any borrower as part of a bundled mortgage package or it may be to the particular borrower. Such for the particular borrower may be a case where the potential borrower is already a customer of the lender, such as a bank that already has a customer for a checking and/or savings account. This step, in addition to the others, may be patterned specific to a customer and/or general to the public under certain conditions. At step 407, a determination is made as to whether customary third party fees are waived. Alternatively, in step 407, a determination may be made as to whether all third party fees are waived. If not, the process moves to step 409. If third party fees are waived, the process moves to step 408.

In step 408, the lender pays for customary third party fees for the potential borrower in an attempt to provide another service to the borrower to convince her to obtain a mortgage loan with that lender. Proceeding to step 409, a determination is made as to whether a lender title policy is needed. Such is customary in the industry. If not lender title policy is needed, the process moves to step 411. If a lender title policy is needed, the process moves to step 410 where the lender obtains a title policy on the property in question.

Moving to step 411, a determination is made as to whether the lender will pay for the owner's title policy. An owner's title policy is often less expensive than a lender's title policy on the same property. Step 411 may be accomplished by a lender outright paying for the policy or by a lender reimbursing a borrower for the amount spent for the owner's policy. If the lender will not pay for the owner's policy, the process moves to step 413. If the lender will pay for the owner's policy, the process moves to step 412 where the lender pays for the owner's policy. Again, such a payment may be an outright payment or a reimbursement to the owner/borrower.

At step 413, a determination is made as to whether an escrow account is required by the lender. If an escrow account is required, the process moves to step 417. If an escrow account is required at step 413, the process moves to step 415. Conventionally, when a lender does not require an escrow account, a lack of escrow account fee is charged to the borrower. Alternatively, in accordance with at least one aspect of the present invention, the lack of an escrow account fee for a borrower is waived by the lender in step 415. Proceeding to step 417, the lender waives the requirement for mortgage insurance. Conventionally, such a waiver requires the lender to obtain mortgage insurance and/or for an interest rate adjustment to occur against the borrower. However, in step 419, the lender does not obtain lender mortgage insurance. Such may be the case where a lender has a large enough equity portfolio to not have to sell off a second mortgage on the property in question. At step 421, the lender also does not adjust the interest rate even though no mortgage insurance exists on the property in question.

At step 423, any particular protection plan fee for the borrower is waived by the lender. Then, at step 425, the lender may guarantee that the lender will close on a time specified between the lender and the borrower. A step 427, a determination is made as to whether the lender closed on time. If not, the process moves to step 429 where the lender pays for the entire first month's mortgage payment of the borrower. In an alternative example, a different amount may be specified, such as a specific amount of $1500. Finally, at step 431, the lender may guarantee that the borrower has received the best overall mortgage package with that lender, where a better offer has the lender paying an amount to the borrower, such as $250.00.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the features of the aforementioned illustrative examples may be utilized alone or in combination or subcombination with elements of the other examples. It will also be appreciated and understood that modifications may be made without departing from the true spirit and scope of the present invention. The description is thus to be regarded as illustrative instead of restrictive on the present invention.

The invention claimed is:

1. A computer assisted method for a lender to secure a mortgage for a property comprising:
   receiving, at a computer, data related to a customer;
   providing an interest rate for the mortgage for the property to the customer, wherein the interest rate is the same rate regardless of:
   whether or not the customer is responsible for paying lender fees associated with the mortgage, and whether or not the customer is responsible for paying third party fees customarily associated with the mortgage;
   waiving a requirement for the customer to pay lender fees associated with the mortgage; and
   waiving a requirement for the customer to pay third party fees customarily associated with the mortgage, wherein the interest rate does not change based upon the waived requirements.

2. A computer assisted method for a lender to secure a mortgage comprising:
   receiving, at a computer, data related to a borrower;
   providing an interest rate to the borrower; and
   providing a bundled mortgage package to the borrower, wherein the bundled mortgage package includes a plurality of features, wherein the interest rate provided to the borrower does not change based upon the plurality of features included in the bundled mortgage package, wherein the interest rate is the same rate regardless of whether the bundled mortgage package is provided or not;
   wherein one feature of the plurality of features includes a feature of the lender not requiring the borrower to obtain mortgage insurance in order to secure the mortgage regardless of the amount of the mortgage.

3. The method of claim 2, wherein one feature of the plurality of features includes a feature of the lender waiving lender fees associated with the mortgage.

4. The method of claim 3, wherein the lender fees include origination fees.

5. The method of claim 4, wherein the lender fees include one or more of application fees, mortgage arrangement fees, and administration fees.

6. The method of claim 3, wherein one feature of the plurality of features includes a feature of the lender waiving all lender fees associated with the mortgage.

7. The method of claim 2, wherein one feature of the plurality of features includes a feature of the lender paying third party fees associated with the mortgage.

8. The method of claim 7, wherein the third party fees include one or more of settlement fees, attorneys fees, owner's title fees, and recording fees.

9. The method of claim 2, wherein one feature of the plurality of features includes a feature of the lender not obtaining title insurance for a property upon which the mortgage is based.

10. The method of claim 9,
    wherein one feature of the plurality of features includes a feature of the lender requiring the borrower to have a borrower's title insurance policy for the property upon which the mortgage is based,
    wherein the lender pays for the borrower's title insurance.

11. The method of claim 2,
    wherein one feature of the plurality of features includes a feature of the lender not requiring the borrower to obtain and contribute finances into an escrow account for future costs related to the mortgage,
    wherein the lender waives any fee associated with not having the escrow account.

12. The method of claim 2, wherein the lender does not obtain mortgage insurance.

13. The method of claim 2, wherein one feature of the plurality of features includes a feature of the lender not requiring a fee in order for the borrower to enter into a protection plan protecting against unforeseen circumstances.

14. The method of claim 13, wherein unforeseen circumstances include accidental death and involuntary unemployment.

15. A computer assisted method for a lender to secure a mortgage comprising:
    receiving, at a computer, data related to a borrower;
    providing an interest rate to the borrower; and
    providing a bundled mortgage package to the borrower,
    wherein the bundled mortgage package includes a plurality of features;
    wherein the interest rate provided to the borrower does not change based upon the plurality of features included in the bundled mortgage package, wherein the interest rate is the same rate regardless of whether the bundled mortgage package is provided or not, wherein one feature of the plurality of features includes a feature of the lender establishing a time period within which the borrower closes on the mortgage, wherein the lender provides a predetermined amount of financial compensation to the borrower if a closing does not occur within the time period and the predetermined amount of financial compensation is directly related to and dependent upon the amount of the mortgage.

16. The method of claim 15, wherein the certain amount of financial compensation is a monthly mortgage payment.

* * * * *

UNITED STATES PATENT AND TRADEMARK OFFICE
CERTIFICATE OF CORRECTION

| | | |
|---|---|---|
| PATENT NO. | : 7,865,429 B2 | Page 1 of 1 |
| APPLICATION NO. | : 11/955514 | |
| DATED | : January 4, 2011 | |
| INVENTOR(S) | : Eric Telljohann et al. | |

It is certified that error appears in the above-identified patent and that said Letters Patent is hereby corrected as shown below:

On the Title Pg Item (75), under Inventors, in Neelu Burugapalli's address:
Please delete "Stanley, NC (US)" and insert --Round Rock, TX (US)--

Signed and Sealed this
Twenty-eighth Day of February, 2012

David J. Kappos
*Director of the United States Patent and Trademark Office*